United States Patent Office 3,317,556
Patented May 2, 1967

3,317,556
AMPHOTERIC ALPHA-SULFO-IMIDAZOLINES
Ira M. Rose, Millburn, and James Z. Ginos, Fort Lee, N.J., and William Ramsey Christian, New York, N.Y., assignors to Nopco Chemical Company, Newark, N.J., a corporation of New Jersey
No Drawing. Original application June 22, 1962, Ser. No. 204,597, now Patent No. 3,258,474, dated June 28, 1966. Divided and this application Sept. 8, 1965, Ser. No. 496,217
6 Claims. (Cl. 260—309.6)

This application is a divisional application of Ser. No. 204,597 Rose et al., filed June 22, 1962, now U.S. Patent 3,258,474.

The present invention relates to amphoteric surface active agents and to a process for their preparation. More particularly this invention relates to amphoteric α-sulfo-amides and α-sulfo-imidazolines having a high degree of purity.

α-Sulfo-fatty amides and α-sulfo-imidazolines are excellent surface active agents. They are also useful as foaming agents in shampoos, detergents and other compositions. The α-sulfo-fatty amides as shown by Weil et al. in the Journal of American Oil Chemists 37:295–297 (June 1960) are difficult to apply in aqueous solutions to a material to which it is desired to impart surface active properties. This is due to the fact that these amides are not soluble in aqueous solutions at high concentrations. Hence only dilute solutions of these compounds can be applied to materials such as fabrics or fibers to impart surface active properties to these materials. This reduces the effectiveness of these amides as surface active agents and makes their application to materials such as wool, cotton, expensive and costly.

It is well known in the art to react fatty acids and amines together to produce fatty amides. However, when an α-sulfo-fatty acid is reacted directly with an amine, a stable amine salt is formed, which will then undergo amidization only when the product is strongly heated. This is due to the fact that the α-sulfo group which is a much stronger acid than the carboxyl group ties up the amine, preventing it from reacting in the usual manner at lower temperatures to form the amide. Also these amine salts are such high melting solids that they do not melt and cannot undergo reaction at lower temperatures in the absence of solvent. Others in the art have prepared α-sulfo-fatty amides by sulfonating the fatty amide directly, rather than by reacting an α-sulfo-fatty acid directly with an amine to produce the α-sulfo amide product. However, the sulfonation of the fatty amides produces a mixture of products which have been thought to contain some α-sulfo-fatty amides, as well as the products which are formed when sulfonation takes place on the amine group of the amide as well as on the other carbon atoms of the fatty acid ralical. By utilizing this procedure very small yields of α-sulfo-fatty amides may have been obtained. However, it was also found that if the fatty acid amide contained an additional function group, it was impossible to sulfonate any of the carbon atoms of the fatty acid radical of the amide.

In order to overcome the aforementioned difficulties of preparing α-sulfo-fatty amides, a method disclosed by Weil et al. in the Journal of the American Oil Chemists' Society 37:295–297 (June 1960) was utilized whereby an α-sulfo-fatty acid such as α-sulfostearic acid was first reacted with a large excess of purified thionyl chloride or any other chlorinating agent to form α-sulfo stearoyl chloride. This chlorinated product was next reacted with the desired amine to form the α-sulfo-fatty amide. A great drawback in this procedure is that is has been impossible to obtain yields above 45% due to the formation of by-products from the chlorination reaction of the α-sulfo stearic acid. Another disadvantage of the above procedure is that it is costly due to the use of a large excess of thionyl chloride which is completely lost during the process.

It is an object of this invention to provide a new and improved surface active agent.

It is a further object of this invention to provide new compounds which are useful as detergents, wetting agents, surface active agents and the like.

It is a further object of this invention to provide amphoteric-α-sulfo-fatty acid amides and α-sulfo-fatty imidazolines.

It is a further object of this invention to provide surface active agents which have improved solubility in acidic, basic and neutral solutions.

It is a further object of this invention to provide surface active agents which can be easily applied to fabrics in either neutral, acidic or basic solutions.

It is a further object of this invention to provide an economical, highly efficient method of producing α-sulfo-fatty acid amides and α-sulfo imidazolines.

It is a further object of this invention to provide a new and novel process for the production of α-sulfo-fatty acid amides and α-sulfo-fatty acid imidazolines including the novel amides and imidazolines of this invention which may be carried out efficiently on a commercial scale.

Other objects of this invention will in part be obvious and will in part appear hereinafter.

We have found that new and improved amphoteric surface active agents having the following formula:

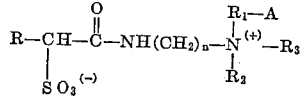

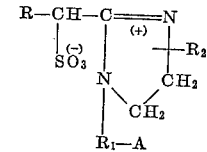

and

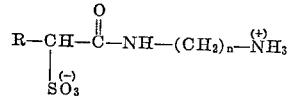

wherein R is an aliphatic saturated hydrocarbon radical having from 9 to 21 carbon atoms such as $C_{17}H_{35}$, $C_{13}H_{27}$, $C_{15}H_{31}$, $C_{11}H_{23}$, $C_9H_{19}$, $C_{21}H_{43}$ etc., $R_1$ is a divalent alkylene hydrocarbon radical having from 1 to 10 carbon atoms such as methylene, butylene, propylene, vinylidene, nonylene, octylene, etc., $R_3$ is slected from the group consisting of hydrogen and an aliphatic saturated hydrocarbon radical having from 1 to 10 carbon atoms such as ethyl, methyl, hexyl, nonyl, propyl, butyl, etc., and $R_2$ is selected from the group consisting of hydrogen and saturated or unsaturated aliphatic or aralkyl hydrocarbon radicals containing from 1 to 10 carbon atoms such as methyl, ethyl, hexyl, nonyl, benzyl, pentyl, allyl, etc., A is a monovaent radical selected from the class consisting of H, —OH, —$NH_2$, and —$NHR_2$ ($R_2$ having the same meaning given above) and $n$ is an integar from 2 to 10, preferaby 2 to 4, provide new and improved surface active agents which can be readily applied to fabrics from either acid, base or neutral solutions.

The amide compounds of this invention can be formed by reacting approximately equimolar proportions of an α-sulfo-fatty acid or a lower alkyl ester thereof and a polyamide in the presence of an inert organic solvent by heating to a temperature ranging from about 157° C. to about 220° C. for a period ranging from about two hours to 10 hours while simultaneously azeotropically distilling off one mole of water in the case where an α-sulfo-fatty acid is used or one mole of the corresponding alcohol in the case where an ester of the α-sulfo-fatty acid is used, per mole of the compound formed or the limiting reactant. The product thereafter isolated is the α-sulfo-fatty amide. When an excess of one of the reactants is utilized to form the amid, the other reactant limits the amount of amide produced and hence becomes the limiting reactant. In all cases, the amount of water or alcohol distilled off is about one mole for every mole of the limiting reactant or for every mole of compound formed. Also the presence of a solvent is a critical factor in obtaining the high yield of products produced by the process of our invention.

The imidazoline compound of this invention can be formed by reacting approximately molar proportions of an α-sulfo-fatty acid or a lower alkyl ester thereof and a polyalkylene polyamine having at least two amino groups, at least one of which is a primary or secondary amino group in the 2 position to a primary amino group, in the presence of an inert organic solvent, by heating to a temperature ranging from about 158° C. to about 220° C. for a period ranging from about two to ten hours while simultaneously azeotropically distilling off two moles of water in the case where an α-sulfo-fatty acid is used or one mole of corresponding alcohol and one mole of water where an α-sulfo-fatty acid ester is used, per mole of this compound formed on the limiting reactant. The product thereafter isolated is the α-sulfo-fatty imidazoline. A molar excess of one of the reactants may be utilized to form the imidazoline. When an excess of one reactant is utilized, the other reactant limits the amount of imidazoline produced and hence becomes the limiting reactant. In all cases the amount of water and/or alcohol distilled off should be about two molar equivalents based on the moles of the limiting reactant. Also the presence of a solvent is a critical factor in obtaining the high yield of this product.

By utilizing the method of this invention we have found that amphoteric α-sulfo-fatty acid amides and α-sulfo imidazolines may be produced by direct amidation, by reacting a polyamine having at least one primary amine with an α-sulfo-fatty acid or a lower alkyl ester thereof in the presence of a high boiling solvent, at a temperature of from about 157° C. to about 220° C. while simultaneously removing the water formed by the reaction or the alcohol formed in the case of when an ester is used by means of azeotropic distillation. In this manner amphoteric α-sulfo-fatty amides and imidazolines may be produced economically and efficiently in yields as high as 90% without the costly procedures required by the methods of the prior art.

The method of this invention may also be utilized to produce all known and standard α-sulfo-fatty acid amides including those disclosed by Weil et al., Journal of American Oil Chemists 37:295–297 (June 1960), and all of the α-sulfo-fatty amides as well as the amphoteric α-sulfo amides and imidazolines of this invention. This is due to the fact that by utilizing the method of this invention, it is possible to produce α-sulfo-fatty amides and imidazolines by direct amidation. Thus, in producing the known and standard amides as well as the novel amides and imidazolines of this invention, any mono alkyl amine such as methyl amine, butyl amine, propyl amine, etc. or polyalkylene polyamine such as amino ethyl ethylene diamine, etc. having at least one primary amine group may be reacted directly with any of the aforementioned α-sulfo-fatty acids or esters thereof so as to produce an α-sulfo-fatty amide by means of the method of this invention.

The α-sulfo-fatty acids which can be used in our invention should be in a high state of purity and should contain from 8 to 22 carbon atoms with the sulfonyl radical on the α carbon of the fatty acid. These α-sulfo-fatty acids are well known and may be readily produced by taking straight chain fatty acids or lower alkyl esters thereof or any mixtures of the straight chain acids or esters and sulfonating with sulfur trioxide, oleum or chlorosulfonic acid or any other strong sulfonating agent. Exemplary of fatty acids which may be sulfonated to α-sulfo acids usable in accordance with our invention to produce the aforementioned amides or imidazolines, include caprylic acid, capric acid, arachidic acid, behenic acid, myristic acid, palmitic acid, stearic acid, lauric acid, or mixtures of any of the foregoing acids. Any of the lower alkyl esters of the aforementioned acids can be utilized in place of the acids in the process of this invention. These esters include the methyl, ethyl, propyl, and butyl esters of the aforementioned acids. The α-sulfo-fatty acids and esters thereof usable in our novel process for producing the novel compounds of this invention are readily available commercially.

Mono alkali metal salts such as the sodium, potassium, etc. salt of the α-sulfo-fatty acid or its ester can be used instead of the free acid or the ester of the free acid in accordance with the process of our invention. However, when mono alkali metal salts are used, the yield of the final desired product is reduced to approximately one-half the yield obtained by utilizing the free acid or its ester. This is true since by this reaction, one-half of the mono alkali salt used is converted to the dialkali salt of the α-sulfo-fatty acid and the other half of said salt is converted to the amphoteric α-sulfo amide product. The disodium salt of α-sulfo acid may be separated easily from the final amide product. In summary this starting material may be represented by the formula:

wherein R has the same meaning hereinbefore given, Y is hydrogen or an alkali or alkaline earth metal cation and X is hydrogen or a lower alkyl radical.

Amines which may be utilized in our invention to form the novel amphoteric α-sulfo-fatty amides may be any polyalkylene polyamine having at least two amino groups, at least one of which is a primary amine. Exemplary of such amines include alkylene diamines such as: ethylene diamine, propylene diamine and hexamethylene diamine; polyalkylene polyamines such as imino bis propyl amine, N-alkyl imino bis propylamine, diethylene triamine, triethylene tetramine, tetraethylene pentamine, di amino propyl ethylene diamine, dibutylene triamine; dialkylamino alkyl amines such as dimethyl amino propyl amine, diethyl amino ethyl amine, dibutyl amino ethyl amine, dihexyl amino ethyl amine, morpholino propyl amine and hydroxy alkyl polyalkylene polyamines such as amino ethyl ethanol amine, amino ethyl propanol amine, hydroxy ethyl diethylene triamine, etc.

In forming the novel amphoteric imidazolines, only polyalkylene polyamines having at least two amino groups, at least one of which is a secondary or primary amino group in the 2 position to a primary amino group may be reacted with the aforementioned α-sulfo-fatty acid or ester thereof. Examples of amines which may be utilized to produce the amphoteric imidazolines of this invention include, diethylene triamine, amino ethyl ethanolamine, di-propylene triamine, tri-ethylene tetramine, tetra ethylene pentamine, as well as other polyalkylene polyamines of similar nature. When the above mentioned amino groups are in the 1 and 3 position to each other as exemplified by imino bis propyl amine, a six membered heterocyclic ring compound can be formed, namely a tetrahydropyrimidine.

The quantity of α-sulfo-fatty acids to amine utilized in our novel process may be varied widely without detriment to the amidation reaction itself. Of course, when a non stoichiometric amount of either reactant is employed, the excess reactant should be removed from the α-sulfo-fatty acid product. In the preferred embodiment of our invention, an equimolar amount of amines and fatty acids are reacted to produce an α-sulfo-fatty acid amide or imidazoline.

Any inert organic solvent, e.g., higher aliphatic alcohols and aliphatic hydrocarbons, having a boiling point above 157° C. which will substantially dissolve the reactants used in our invention may be utilized to bring about the reaction of the α-sulfo-fatty acids and the amine. It is essential that the solvent have a boiling point above 157° C. since the reaction between the amine and the α-sulfo-fatty acid to produce the novel compounds of this invention takes place at temperatures above 157° C. This is shown by the fact that the reaction does not take place in refluxing hexanol which boils at 157° C. Exemplary of solvents which can be utilized in the process of this invention include 2-ethylhexanol-1, octanol-1 and octanol-2. In the process of this invention, sufficient solvent should be employed to substantially dissolve all of the reactants at the temperature at which the reaction is to taken place and to permit azeotropic distillation of the water formed by the reaction. Great excesses of solvent may be utilized in this process without deleteriously effecting the reaction. However, generally it is found that providing large excesses of solvent increases the cost and time of removing the water and is in general uneconomical.

In order to produce the compounds of this invention and to carry out the reaction, the amine and the α-sulfo-fatty acid must be heated to a temperature of from about 158° C. to 215° C. By utilizing a temperature of 157° C. or below, the α-sulfo-fatty acid amide or imidazoline will not be formed. This is true since at temperatures below 158° C. only the amine salt of the α-sulfo-fatty acid exists and this salt is not converted to the amide at temperatures below 158° C. Temperatures greater than 215° C. may be utilized without deleteriously effecting the reaction. Generally, it has been found that utilizing temperatures above 215° C. is uneconomical, since it is necessary to utilize solvents which boil at these high temperatures as well as requiring additional heating.

The procedure followed in the admixture of the components of our invention may be varied. For example the components can be mixed at room or elevated temperatures before carrying out the reaction at a temperature of from above 157° C. to 215° C. Either reactant, that is the fatty acid or the amine can be dissolved in the inert organic solvent while the other reactant is added thereto. Alternatively, the fatty acid and amine may be premixed and then dissolved in the organic solvent, before carrying out the reaction by heating to a temperature of from about 158° C. to 215° C.

Since the α-sulfo acids are all solids, it is preferred to have one of the reactants, that is either the amine or the α-sulfo acid in solution before the other reactant is added. The second reactant may be added dissolved in the aforementioned high boiling solvent to the first reactant or it may be added to the first reactant in concentrated or undiluted form. In the latter case, the first reactant should be dissolved in the aforementioned high boiling solvent. In some cases, it might be preferable to have one or both of the reactants dissolved in a low boiling solvent during the mixing step so long as the high boiling solvent is present in the final reaction mixture. This low boiling solvent may be removed from the high boiling solvent by heating to the temperature at which the reaction proceeds. Alternatively the amine salt may be prepared by reacting the amine and α-sulfo-fatty acid in a solvent boiling below 157° C. at any temperature below 157° C. (between room temperature and 157° C.) The amine salt can then be filtered from the solvent and added to a solvent boiling at a temperature of above 157° C. and the α-sulfo amide or imidazoline may be prepared by heating the amine salt to a temperature of over 157° C. in said solvent.

The procedure employed in our novel process consists of preparing a solution of the reactants in an inert organic solvent and then heating the solvent containing the reactants to a temperature of about 158° C. to 215° C. while constantly removing the water or alcohol formed by the reaction of the α-sulfo-fatty acid or ester and the amine from the reaction medium. The removal of water or alcohol is accomplished by azeotropic distillation with the solvent. Upon removal of a requisite amount of water or alcohol from the system, the reaction is determined complete and the α-sulfo amide or imidazoline thus produced is recovered from any remaining solvent. The recovery of the α-sulfo amide or imidazoline from the solvent may be readily accomplished by filtration in the case where the α-sulfo amide is insoluble in the solvent; and where it is soluble in the solvent, by distillation under reduced pressure.

In order to more fully illustrate the nature of this invention and the manner of practicing the same, the following examples are presented to illustrate the invention.

*Example I*

This example illustrates the preparation of N-(hydroxyethylaminoethyl) α-sulfo palmitamide.

In this example, 24 grams (0.07 mol) of α-sulfo palmitic acid, 7.4 grams (0.07 mol) of amino ethyl ethanolamine and 250 ml. of 2-ethyl hexanol-1, were added and mixed in a 500 ml. round bottom, three neck flask equipped with a stirrer, thermometer, Dean-Stark water trap and condenser. The mixture was then refluxed at a temperature of approximately 185° C. for 5½ hours. After this period, 1.3 ml. of water (0.072 mol) were collected in the Dean Stark trap which indicated that the formation of the amide was complete. The solution which remained in the flask was cooled by allowing it to remain overnight at room temperature. On cooling, a solid which was the crude N-hydroxyethyl-amino ethyl α-sulfo palmitamide precipitated out of the solution. 150 ml. of acetone were added to the reaction vessel to assure complete precipitation of the product out of the solvent. The product was filtered off from the 2-ethylhexanol-1 and the acetone and washed twice with about 40 ml. of acetone. The total weight of the dried product amounted to 27.5 grams which was 92.5% of the theoretical yield based on the weight of the α-sulfo palmitic acid used.

The product was found to gel in water and to precipitate out of aqueous solutions very slowly. It was also found to be soluble in chloroform and in alkaline aqueous medium.

A chemical analysis for carbon, hydrogen, sulfur and nitrogen was carried out upon the final pure product. The results of this analysis are compared with the calculated theoretical weight percent of carbon, hydrogen, sulfur and nitrogen in N-(hydroxyethyl aminoethyl) α-sulfo palmitamide in the following analysis:

Chemical analysis.—C, 55.51%; H, 10.17%; N, 6.64%; S, 7.39%. Calculated theoretical analysis for N-(hydroxyethyl aminoethyl) α-sulfo palmitamide C, 57.0%; H, 10.0%; N, 6.6%; S, 7.39%.

From the above analysis, it is clear that the chemical analysis of the final product produced by the method of this invention closely corresponds to that theoretically determined from N-(hydroxyethyl aminoethyl) α-sulfo palmitamide.

The above final product was also subjected to an infrared analysis. The infrared curve confirmed the amide structure. The infrared analysis curve showed a maximum absorption at 6.05μ a characteristic peak for the amide group and at 9.70μ a characteristic peak for the —SO₃ group. A small absorption peak was noticed at approximately 6.25μ indicating trace amounts of imidazoline.

*Example II*

This example is directed to the preparation of 1-(2-hydroxyethyl)-2-(1-sulfohendecyl) imidazoline.

In this example, 28.5 grams (0.074 mol) of α-sulfolauric acid, 7.7 grams (0.074 mol) of aminoethyl ethanolamine and 200 cc. of 2-ethylhexanol-1 were added and mixed in a 500 ml. round bottom 3-neck flask which was equipped as in Example I. This mixture was refluxed at a temperature of 184° C. at atmospheric pressure for a total of eight hours. At the end of this period 2.90 cc. (0.16 mol) of water collected in the Dean-Stark trap indicating that the reaction of the acid and amine to form the imidazoline was substantially complete. The solution which remained in the reaction flask was allowed to stand overnight at room temperature. A tan colored precipitate which was identified as the crude 1-(2-hydroxyethyl)-2-(1-sulfohendecyl) imidazoline formed from the solution. This precipitate was filtered from the solution by suction and dried. The product was then recrystallized from methanol and yielded 10.0 grams of a light tan crystalline material which had a melting point of about 170° C.

A chemical analysis for carbon, hydrogen, sulfur and nitrogen was carried out upon the final product to determine the weight percent of each in the final product. The results of this analysis are compared with the calculated theoretical weight percent of carbon, hydrogen, sulfur and nitrogen in 1-(2-hydroxyethyl)-2-(1-sulfohendecyl) imidazoline in the following analysis:

Chemical analysis.—C, 55.63%; H, 9.37%; S, 9.90%; N, 7.93%. Calculated theoretical analysis for 1-(2-hydroxyethyl)-2-(1-sulfohendecyl) imidazoline C, 55.17%; H, 9.26%; S, 9.20%; N, 8.05%.

From the above analysis, it is clear that the chemical analysis of the final product produced by the method of this invention closely corresponds to that theoretically determined from 1-(2-hydroxyethyl)-2-(1-sulfohendecyl) imidazoline.

The above final product was subjected to an infrared analysis. The infrared curve confirmed the imidazoline structure. The infrared curve showed a maximum adsorption at 6.25μ a characteristic peak for the imidazoline structure and 6.55μ and 9.70μ, a characteristic peak of the —SO₃ group. It has been suggested that the adsorption at 6.55μ was caused by the interaction of —SO₃ group with the neighboring imidazoline ring.

*Example III*

This example is directed to the preparation of N-(dimethyl amino propyl) α-sulfo palmitamide.

In this example, 24 grams (0.07 mol) of α-sulfo palmitic acid, 14.6 grams (0.14 mol) of dimethyl amino propyl amine and 250 ml. of 2-ethyl hexanol-1, were added and mixed in a 500 ml. round bottom 3-neck flask which was equipped as in Example I. This mixture was refluxed at a temperature of approximately 185° C. for 9 hours. At the end of this period, 1.7 ml. of water (.094 mol) collected in the Dean-Stark trap which indicated that the reaction was complete. The solution which remained in the reaction flask was allowed to cool by standing at room temperature overnight. On cooling, a light tan precipitate of the N-(dimethyl amino proply) α-sulfo palmitamide product formed. The solid product was filtered from the solvent and washed twice with about 40 ml. of acetone. The product was dried by means of vacuum. The total weight of the dried product amounted to 24 grams which is 85% of the theoretical yield based on the weight of the α-sulfo palmitic acid used.

A chemical analysis for carbon, hydrogen, sulfur and nitrogen was carried out upon the final pure product. The results of this analysis are compared with the calculated theoretical weight percent of carbon, hydrogen, sulfur and nitrogen in N-(dimethyl amino propyl) α-sulfo palmitamide in the following analysis:

Chemical analysis.—C, 60.0%; H, 10.5%; N, 7.6%; S, 6.7%. Calculated theoretical analysis for N-(dimethyl amino propyl) α-sulfo palmitamide C, 58.3%; H, 10.5%; N, 7.7%; S, 6.5%.

From the above analysis, it is clear that the chemical analysis of the final product produced by the method of this invention corresponds to that theoretically determined from N-(dimethylamino propyl) α-sulfo palmitamide.

The above final product was subjected to an infrared analysis. The infrared analysis curve confirmed the amide structure. The infrared analysis curved showed a maximum adsorption at 6.05μ, a characteristic peak for the amide group and 9.73μ, a characteristic peak for the —SO₃ group.

Having described our invention, we claim:

1. The amphoteric compound of the formula:

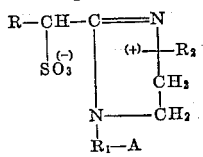

wherein R is an aliphatic hydrocarbon radical of from 9 to 21 carbon atoms, R₁ is a divalent aliphatic hydrocarbon radical of from 1 to 10 carbon atoms, R₂ is selected from the group consisting of hydrogen and aliphatic hydrocarbon radicals of from 1 to 10 carbon atoms, and A is selected from the group consisting of, —H, —OH, —NH₂, —NHR₂.

2. The amphoteric compound of the formula:

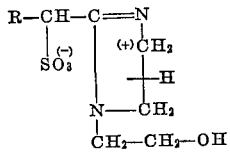

wherein R is an aliphatic hydrocarbon radical of from 9 to 21 carbon atoms.

3. The compound of claim 2 wherein R is C₉H₁₉.
4. The compound of claim 2 wherein R is C₁₅H₃₁.
5. The compound of claim 2 wherein R is C₁₁H₂₃.
6. The compound of claim 4 wherein R is C₁₃H₂₇.

References Cited by the Examiner

UNITED STATES PATENTS

| | | | |
|---|---|---|---|
| 2,214,152 | 9/1940 | Wilkes | 260—309.6 |
| 2,267,965 | 12/1941 | Wilson | 260—309.6 |
| 2,355,837 | 8/1944 | Wilson | 260—309.6 |
| 2,484,146 | 10/1949 | Barber et al. | 260—309.6 |
| 2,574,537 | 11/1951 | de Groote et al. | 260—309.6 |
| 2,785,126 | 3/1957 | Scott et al. | 260—309.6 |
| 2,987,514 | 6/1961 | Hughes et al. | 260—309.6 |

WALTER A. MODANCE, *Primary Examiner.*

NATALIE TROUSOF, *Assistant Examiner.*